United States Patent

[11] 3,627,265

| [72] | Inventors | Elmer Payne<br>P.O. Box 93, Chapmanville, W. Va. 25508;<br>Ray Blevins, P.O. Box 99, Danville, W. Va. 25053 |
|---|---|---|
| [21] | Appl. No. | 44,807 |
| [22] | Filed | June 9, 1970 |
| [45] | Patented | Dec. 14, 1971 |

[54] CONVEYOR BELT SPLICING APPARATUS
10 Claims, 6 Drawing Figs.

[52] U.S. Cl. ................................................. 254/53
[51] Int. Cl. .............................................. F16g 11/12
[50] Field of Search ................................... 254/51, 52, 53, 54

[56] References Cited
UNITED STATES PATENTS

| 224,378 | 2/1880 | Baughman | 254/53 |
| 336,571 | 2/1886 | Lawrence | 254/53 |
| 380,150 | 3/1888 | Vandecar | 254/53 |
| 1,049,855 | 1/1913 | Hedrick | 254/53 |
| 1,911,071 | 5/1933 | Duncan | 254/53 |

*Primary Examiner*—Andrew R. Juhasz
*Assistant Examiner*—David R. Melton
*Attorney*—Kimmel, Crowell & Weaver ABSTRACT: In splicing together the separated ends of a normally endless belt conveyor, clamp means releasably connected on the belt proximate, respectively, the adjacent ends thereof, and power-operated winch means connected on and extending between the clamps, the winch means being operable to draw one end of the belt towards the other to bring the same into juxtaposition and to thereby facilitate their connection, one with the other.

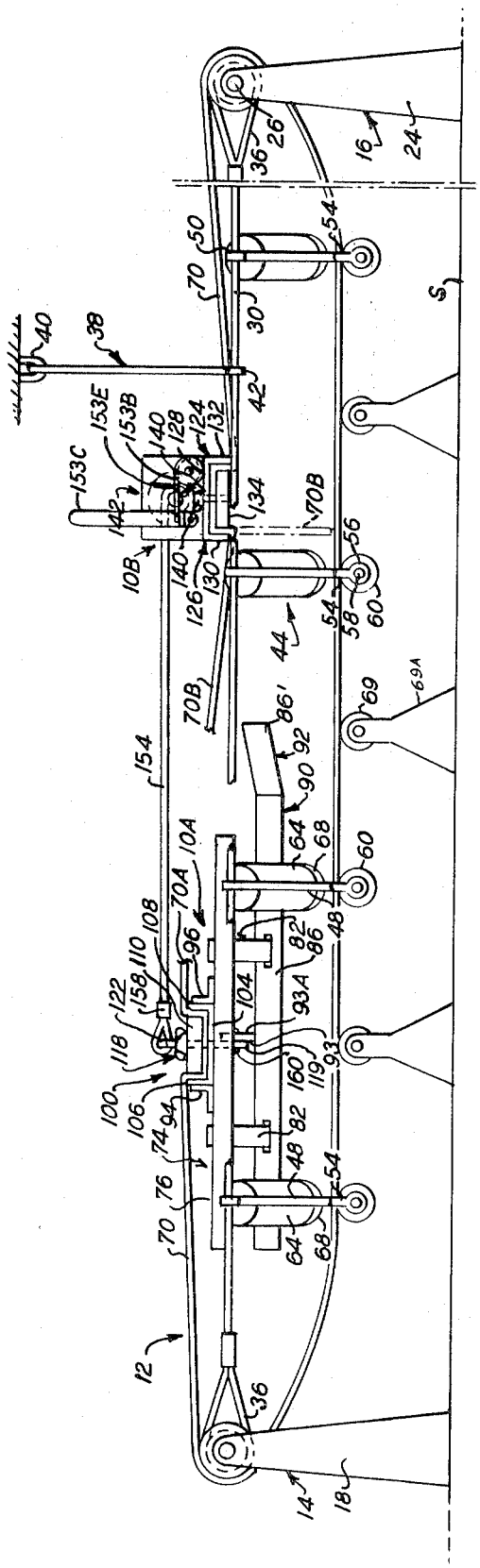
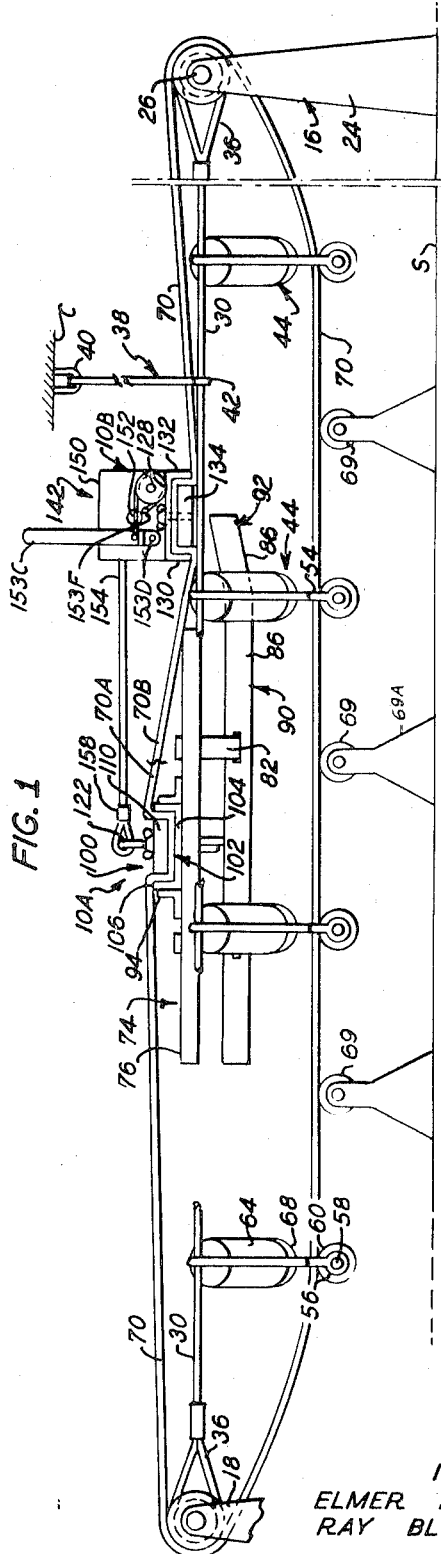

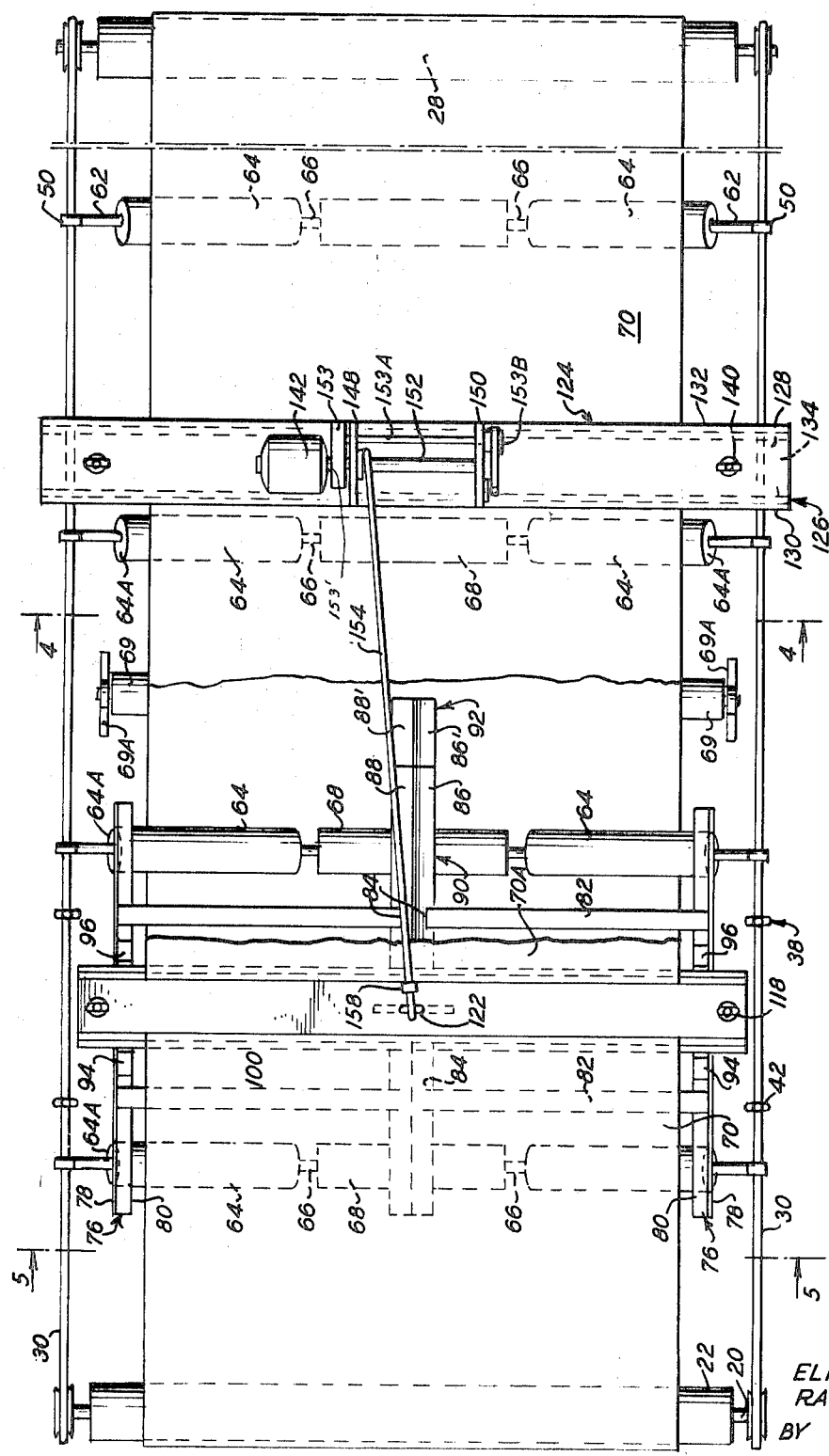

INVENTORS
ELMER PAYNE
RAY BLEVINS
BY

Kimmel, Crowell & Weaver
ATTORNEYS

CONVEYOR BELT SPLICING APPARATUS

BACKGROUND OF THE INVENTION

Field of the Invention

This invention relates to the repair of a broken endless conveyor belt, and includes a first stationary clamp means releasably connected on the belt adjacent one of its ends, this clamp means mounting a power-operated cable winch, and a second clamp means releasably secured on the belt adjacent its other end, the last-named clamp means being cable connected to the winch and being movable towards the first clamp means when the winch is powered, thereby causing the belt to be drawn over the conveyor rollers and move towards the first clamp means when the winch is powered, thereby causing the second belt end to move towards and into juxtaposition relative to the first belt end thereof for subsequent connection, one end with the other.

Description of the Prior Art

The prior art is replete with many forms of belt stretchers specifically designed to facilitate the connection of the ends of a broken conventional endless belt type of conveyor. Basically, most of the known prior art mechanisms utilize a pair of clamps for connection to the ends of the broken belt when seeking to repair the same, and some type of winch means for effecting movement of the clamps, relatively, towards one another. In the prior art, one finds related apparatus which includes a cable-winding drum, a ratchet- and panel-mechanism to hold the cable under tension, and manually operated lever means for rotating the drum. Practically all of the prior art devices include exposed gearing systems, exposed ratchet- and pawl-holding apparatus, and manually operable lever means for effecting the tightening of the cable drum. From a standpoint of safety, exposed gearing and ratchet- and pawl-tension holding devices constitute safety hazards, and most of the drum-operating levers are of appreciable length making necessary the provision of sufficient space not only to effect the operation of the lever but also to provide the operator with an area in which he may somewhat freely move.

Mechanically speaking, related and known earlier devices germane to the instant invention range from a somewhat noncomplex organization of parts as is shown in the U.S. Pat. to John Baughman, No. 224,378 to a relatively more sophisticated assembly as is disclosed in the U.S. Pat. issued to Burl V. Hedrick, No. 1,049,855.

While the patents specifically named above, and other known apparatus, are functional and serve their respective purposes, none specifically seem to have been designed to meet the needs of the coal-mining industry. From an examination of known prior art devices it would be reasonable to assume that these become useful only after the adjacent ends of the conveyor belt have been, in some manner, brought fairly close to one another. How this desirable result is accomplished is not disclosed in prior art patents, and thus an important problem has been ignored or completely overlooked.

Breakage of an endless belt conveyor as utilized in a coal mine is of major concern from, at least, the economic viewpoint, for it requires the joint efforts of six or more men to replace the conveyor belt over the conveyor rollers and to thereafter make the necessary repairs in joining the broken ends of the conveyor belt. In this connection, it should be observed that in conventional coal mining utilizing endless belt conveyors, and depending upon the length of the belt and the load carried thereon, anywhere from 50 to 250 feet of belting may run off the rollers before the conveyor is stopped after belt breakage.

SUMMARY OF THE INVENTION

While this invention has been mentioned above in terms of specific reference to the coal-mining industry, it will be recognized that the inventive concept has application to other fields of industry in which endless conveyor belt systems are utilized. The invention has, therefore, as one of its primary objects, the provision of apparatus for replacing a broken conveyor belt over its rollers and of means for bringing the adjacent ends of the broken belt into juxtaposition for subsequent connection with one another, the apparatus being operable in any field employing an endless belt conveyor system.

It is another object of this invention to provide apparatus of the type to which reference has been made above, and wherein the apparatus is power driven while still being substantially light in weight, and wherein the apparatus may be operated by but a minimum number of mechanics.

A further object of the invention is to provide compact belt replacing and stretching apparatus which is operable while affording a maximum degree of insurance against personal injury.

Still another object of this invention is to provide apparatus of the type described, the apparatus being noncomplex in construction and assembly, inexpensive to manufacture and maintain, and wherein the apparatus is rugged and durable in use.

Other and further objects and advantages of the instant invention will become more manifest from a consideration of the following specification when read in conjunction with the annexed drawings.

BRIEF DESCRIPTION OF THE DRAWINGS

FIG. 1 is a side elevational view of a conventional coal mine endless belt conveyor system, FIG. 1 illustrating the apparatus of this invention in its operative position for drawing an end of a broken belt over the conveyor rollers for subsequent juxtaposition relative to its other end, all leading to the subsequent connection of the belt ends, one to the other;

FIG. 2 is a side elevational view, similar to FIG. 1, FIG. 2 illustrating the relative positions of the apparatus of this invention and the conveyor belt relative to its rollers when the free ends of the conveyor belt are in position for repairs;

FIG. 3 is an enlarged top plan view of the apparatus shown in FIG. 1;

DESCRIPTION OF THE PREFERRED EMBODIMENT

Figure 5:
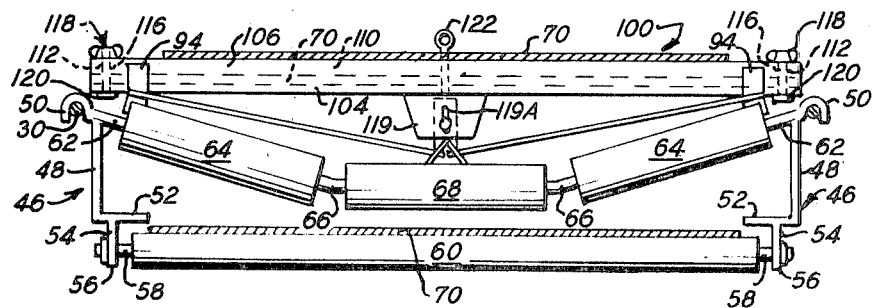
FIG. 5 is a transverse detail cross-sectional view, FIG. 5 being taken on the vertical plane of line 5—5 of FIG. 3, looking in the direction of the arrows.

Referring now more specifically to the drawings, reference numeral 10 generally designates a conveyor belt replacing and stretching apparatus constructed in accordance with the teachings of this invention. At 12 there is indicated a simplified conventional coal mine endless belt conveyor system. Since the system does not comprise the subject matter of this invention, and is conventional in the art, the description and the illustration thereof will be limited herein to the extent necessary for the complete comprehension of this invention.

Thus, and in FIGS. 1 and 2, reference numerals 14 and 16 designate, respectively, the conveyor head- and tailpiece assemblies. The headpiece assembly includes a pair of laterally spaced upright parallel standards 18 secured by conventional means (not shown) to a coal mine supporting surface S. The standards 18 journal the opposed ends of the shaft 20 for rotation in the upper ends thereof. Connected on the shaft 20 for rotation therewith is a conventional conveyor roller 22, and the usual power means (not shown) is connected in driving relation with the shaft 20.

The tailpiece assembly is similar to that of the headpiece, the tailpiece assembly including a pair of laterally spaced and parallel upright standards 24 which are secured on the surface S, and on the upper ends of these standards the opposed ends of the second shaft 26 are rotatably journaled. Connected on the shaft 26 for rotation therewith is an idler roller 28.

Each reference numeral 30 denotes an elongated flexible cable, the cables 30 comprising the suspension means for intermediate idler rollers to which further reference will be made infra. The cables 30 are disposed, respectively, on each side of the conveyor and normally extend substantially parallel to one another.

In conventional coal mine conveyors, the opposed ends of each cable are anchored to the standards 18, 24 at each side of the conveyor, and the anchoring means may comprise any mechanical connection known in the arts. In the instant drawings, the anchoring means is shown as comprising a pair of dead pulleys 32 mounted, respectively, on the opposed ends of the shaft 20, and a second pair of pulleys 34 mounted, respectively, on the opposed ends of the shaft 26. The shafts are free to rotate within their respective associated pulleys. The pulleys 32, 34 at each side of the conveyor 12 are aligned with one another and receive thereover the looped end 36 of each of the cables 30. In the conventional manner, a plurality of eyebolts 38 are suspended from the mine ceiling C as by conventional means 40, and the lower annular ends 42 thereof receive portions of each cable 30, respectively, therethrough.

Figure 6:
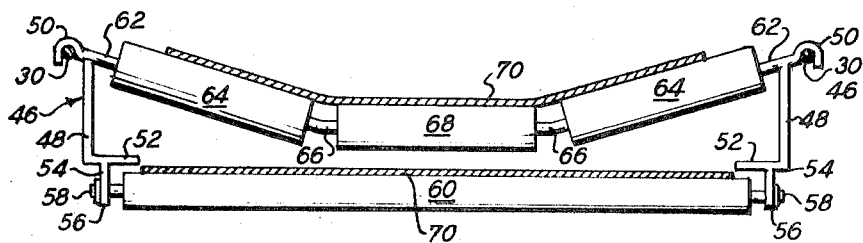
FIG. 6 is a transverse detail cross-sectional view through the conveyor system after the repair apparatus has been removed and with the conveyor belt restored to its normal operating position.

Reference numerals 44 each denote a set of idler rollers. Each set of idler rollers 44 (see FIG. 6) comprises a pair of identically constructed hanger brackets 46 (see FIG. 6) each having a normally upright central bight portion 48 from the upper end of which is laterally and outwardly offset a downwardly opening arcuate arm 50. Converging inwardly from the lower end of each of the hanger brackets 46 is a flange 52, the flanges of each set of idler rollers 44 converging towards one another. Depending from each flange 52 is a lug 54 which, at its lower end, terminates in an enlarged centrally apertured annular boss 56. The bosses 56 journal for rotation the opposed ends of a shaft 58 therein. Mounted on each of the shafts 58 is the usual and conventional idler roller 60.

Each of the bight portions 48, adjacent their respective upper ends, also includes a downwardly and inwardly inclined integrally connected shaft 62 on which is rotatably supported, respectively, one of the ends of a pair of downwardly and inwardly inclined idler rollers 64. The other lower ends of each of the idler rollers 64 are supported for rotation on one of the arms, respectively, of a pair of V-shaped shafts 66 and the other arm of each of the shafts 66 rotatably supports a normally horizontal idler roller 68.

Each of the sets of idler roller assemblies 44 is mounted on the cables 30 by engaging, respectively, the arcuate arms 50 thereover. The assemblies 44 are longitudinally spaced relative to the cables 30 and extend transversely thereof.

At 70 is indicated an elongated endless flexible conveyor belt which is normally trained around the rollers 22, 28 and which passes over the rollers 64, 68, and over the idler rollers 60. The lower conveyor flight is also supported on spaced idler rollers 69 which are mounted for rotation between opposed pairs of standards 69A, the latter being supported on the coal mine floor surface S.

The apparatus 10, with which this invention is immediately concerned, is compound in the sense that it is a two-piece unit with the separate pieces thereof bearing the reference numerals 10A and 10B, respectively.

The apparatus indicated by reference numeral 10A comprises a frame 74 having a pair of angle iron side frame members 76, 76, each of which includes a pair of arms 78, 80. One of the ends of a plurality of downwardly and inwardly extending braces 82 is fixedly secured to the upper side of each of the arms 80, and the lower ends thereof are received within, respectively, a plurality of slots 84 formed in the arms 86, 88 of an inverted substantially V-shaped skid 90. One of the ends of each of the arms 86, 88 terminates in upwardly projecting extensions 86', 88' to form a bumper 92. The length of the arms 78, 80 and of the skid member 90 is, preferably, greater than the distance between an adjacent pair of the sets of idler rollers 44. To serve a function to be described, one end of a normally upright plate 93 is fixedly connected to the skid 90 intermediate its ends, the plate having a slot 93A extending transversely therethrough.

As is seen in FIGS. 1 and 3, the frame 74 is designed to be supported on the rollers 64, 64, 68 of certain sets of idler rollers 44. As is seen in these Figures, the arm 78 of each of the angle iron side frame members 76 engages over the end 64A of each adjacent one of the idler rollers 64, and the arm 80 of each of the angle iron members 76 rests on the upper surface of each of the rollers 64. The lower ends of each of the arms 86, 88 make tangential engagement with the horizontal idler rollers 68. The frame 74 is thus seen to be removably supported on the idler rollers 64, 64 and 68.

Mounted on each of the arms 80 centrally of the ends thereof is a pair of spaced abutment members 94, 96. This completes a description of the frame 74.

At 100 is designated a first clamping means which includes a normally upwardly opening substantially U-shaped clamp jaw 102 having an elongated substantially rectangular bight portion 104 from the longitudinally extending marginal edge of which upwardly project, respectively, the flanges 106, 108. In its operative position, the first clamp jaw 102 is disposed transversely across the side frame members 76 with the flanges 106, 108 fitting flush against the abutment members 94, 96, respectively. The first clamping means 100 also includes an elongated substantially rectangular second clamp jaw 110 which is adapted to be received between the flanges 106, 108 and which has a width less than the distance between the adjacent sides of these flanges. Each end of the second clamp jaw 110 and each end of the bight portion 104 is formed with a pair of transversely extending aligned openings 112, 114, respectively, (see FIG. 5) the openings being adapted to receive therethrough the shank 116 of a wingbolt 118. The shank 116 of each bolt 118 is adapted to threadedly engage a nut 120 whereby tightening of the wingbolts 118 will cause the second clamp jaw 110 to be drawn in the direction of the bight portion 104 of the first clamping means 100. The second clamp jaw 110 is also provided with a fixedly connected and upwardly projecting annular anchor ring 122 which serves a function to be described below, and a functional plate 119 having a slot 119A formed therein.

Figure 4:
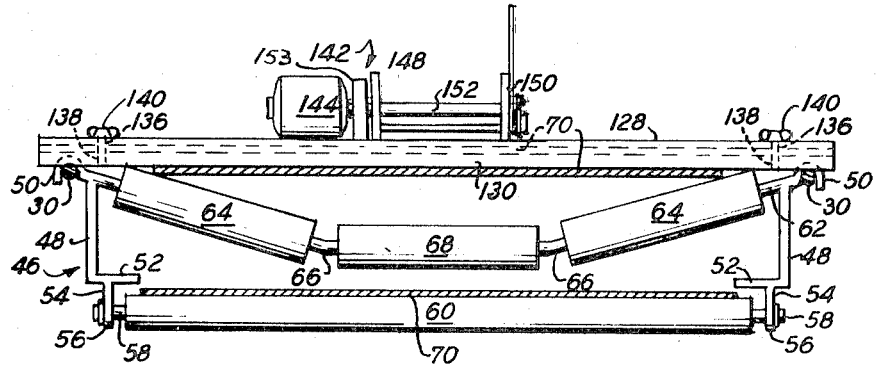
FIG. 4 is a transverse detail cross-sectional view, FIG. 4 being taken on the vertical plane of line 4—4 of FIG. 3, looking in the direction of the arrows.

The apparatus indicated by reference numeral 10B includes a second clamping means 124. This clamping means includes a downwardly opening substantially U-shaped first clamp jaw 126 having an elongated substantially rectangular bight portion 128 from the longitudinally extending marginal edges of which downwardly depend a pair of laterally spaced and substantially parallel flanges 130, 132. Fitted between the flanges 130, 132, and having a width less than the distance between the confronting sides of the flanges is a second elongated substantially rectangular clamp jaw 134. The bight portion 128, adjacent its opposed ends, is formed with transverse openings 136 (see FIG. 4) which are aligned with tapped openings 138, respectively, formed in the clamp jaw 134. The openings 136, 138 are adapted to receive wingbolts 140 whereby upon tightening the same the clamp jaw 134 is moved upwardly in the direction of the bight portion 128 to serve a function to be described.

Reference numeral 142 indicates, in general, a conventional power winch which has been modified in the substitution of an electric driving motor 144 for the usual and conventional winding lever. As is seen in the drawings, the electric motor 144 is fixedly connected on the bight portion 128, and at 146 is generally designated the usual winch drum which includes a pair of normally upright standards 148, 150 that are fixedly connected on the bight portion 128 in spaced relationship relative to one another. A cable shaft 152 is journaled for rotation in the standards 148, 150 and has an end thereof connected in driving relationship with the output shaft 153' driven by the usual speed reduction gearing connected with the drive shaft of the motor 144 and which is here diagrammatically illustrated at 153.

The speed reduction gearing 153 includes a conventional gear train (not shown), and in this system one of the gears of the train is connected in driving relation with one end of a shaft 153A which is journaled for rotation on the Standards 148, 150. The remotely disposed end of the shaft 153 has a brake pulley 153B secured thereon for rotation therewith. A hand-operated lever 153C is pivotally connected on a pivot pin 153D to the standard 150. One end of a flexible brake belt 153E is connected on the lever 153C, and the other end of the belt is normally loosely trained around a portion of the periphery of the pulley 153B and is fixedly connected on a pin 153F that projects laterally from the standard 150. The shaft 153, the brake pulley 153B, the lever 153C, and the flexible brake belt 153E all comprise components of a braking system which may be found in conventional winches.

In its operative position, the clamp jaw 124 extends transversely across the conveyor system 12 with the flanges 130, 132, at their lower ends, engaging over the cables 30. As is seen in FIG. 3, one end of an elongated cable 154 is fixedly connected on the cable shaft 152 for winding thereon, the other end of the cable 154 being looped through the anchor ring 122. A clamp collar 158 may permanently or releasably connect the reverted end of the loop 156 to the cable 154, all in accordance with the preference of the user.

This completes the description of the apparatus constructed in accordance with the teachings of this invention, and while it is believed that the above specification, when read in conjunction with the drawings, clearly discloses the use and the function of the several components, a brief description thereof follows.

As has been mentioned above, when the endless belt of a coal mine conveyor system breaks, it is not unusual that anywhere from 50 to 250 feet of the belt will become displaced from the rollers of the system. Belts for such systems are relatively heavy, cumbersome to handle and require the services of a number of mechanics to replace the same on the rollers before the belt splicing can be accomplished. It has also been stated above that the prior art reveals many devices for stretching a broken conveyor belt in such a manner as to bring the broken ends into juxtaposition relative to one another to effect the necessary rejoining thereof. None of the known prior art devices appear to have contemplated the provision of means for mechanically replacing the conveyor belt over the rollers while at the same time providing means for bringing the severed ends into proximity with one another to enable the belt splicing to be accomplished. It is among the principal objects of this invention to provide apparatus having such functions.

In describing the operation of the apparatus 10, reference is first made to FIG. 1 of the drawings.

In the following description, it will be understood that the procedural steps recited need not be performed in the order given, and that the same may vary, depending upon prevailing conditions.

With this preface it will now be assumed that the conveyor belt 70 has broken, providing the severed belt end portions 70A, 70B. The frame 74 is now assembled on a pair of adjacent sets of idler roller assemblies 44 with the side frame members 76 being supported on the idler rollers 64. It will be here noted that the skid member 90 engages and spans at least one pair of the idler rollers 68, and that the bumper 92 extends in the direction of the broken end portion 70B of the belt 70. The first U-shaped clamp jaw 102 of the first clamping means 100 is now inserted between the pairs of abutment members 94, 96, and the plates 93, 119 are connected by conventional fastening means 160 which passes through the openings or slots 93A, 119A, after which a portion of the belt 70 adjacent the severed end 70A is led across the upper end of the flange 106, across the bight portion 104 and over the upper end of the flange 108 leaving the end 70A extending in the direction of the end 70B. The second clamp jaw 110 is now inserted in the first clamp jaw 102 and the wingbolts 118 are tightened to clamp the belt 70 between the two clamp jaws.

The second clamping means 124 is now installed transversely of the conveyor system 12, the lower ends of the flanges 130, 132 being supported on the cables 30 adjacent the respective ends of the flanges. As is seen in FIGS. 1 and 3, the second clamping means 124 is disposed to the right (as viewed in FIG. 1) of one of the sets of idler rollers 44, or to describe the position of the second clamping means, it may be said that it is disposed on that side of one of the sets of idler rollers 44 which is remotely positioned with respect to the severed end 70A of the belt 70. The severed end 70B is then extended across the lower ends of the flanges 130, 132 and the bight portion 128. The second clamp jaw 134 is now inserted in the first clamp jaw 126 to extend between the flanges 130, 132 and the wingbolts 140 are then tightened to draw the second clamp jaw 134 against the bight portion 128 to clamp the adjacent portion of the belt 70 therebetween. The severed end portion 70B will now be in its dotted-line position as shown in FIG. 1.

Thereafter, the depending severed end portion 70B is raised to extend over the adjacent set of idler rollers 44 and in the direction of the severed end portion 70A. The second clamping means 124 becomes, thus, wedged against this set of idler rollers and the interposed portion of the belt.

With the second clamping means 124 operatively connected with the belt 70 in the manner described, the cable 154 is payed off the shaft 152 and the looped end 156 is connected with the anchor ring 122. Thereafter, the winch motor 144 is energized to cause the cable shaft 152 to rotate in a clockwise direction, reference being had to FIG. 1 of the drawings, and thereby effecting the winding of the cable 154 thereon. As the cable is wound, the frame 74 together with its connected first clamping means 100 is drawn to the right, reference being had to FIG. 1, whereby the severed end portion 70A and adjacent portions of the belt 70 are caused to move in the same direction. The frame members 74, 76 slide over the upper ends of the opposed idler rollers 64 and the skid member 90 slides over the idler rollers 68. Should there be a tendency for the leading end of the frame 74 to tilt slightly downwardly as the skid member 90 passes from one set of idler rollers 44 to the next adjacent set, the upwardly inclined bumper 92 will engage the next one of the idler rollers 68 causing the frame 74 to achieve its normal level position relative to a horizontal plane.

As the cable 154 is winched in, the belt ends 70A, 70B will approach one another until the same are brought into end-to-end engagement with one another or in overlapping relationship, all depending upon the type of repair connection that is to be made to effectively connect the severed ends together. When the severed ends 70A, 70B have been brought into their respective repair positions, the lower section of the belt 70 will be engaged against the upper side of the idler rollers 60 and the belt 70 will thus be placed under tension.

When the belt ends 70A, 70B have been brought into their juxtaposed repair positions, the brake lever 153C is manually operated to cause the same to pivot in a counterclockwise direction, reference being had to FIGS. 1 and 2 of the drawings. This will cause the brake belt 153E to tighten about the brake pulley 153B to hold the shaft 153A stationary. As this braking operation takes place, the electric motor 144 is deenergized. The braking system will now function to prevent separation of the ends 70A, 70B, which are under tension, until the repairs have been effected. The lever 153C may then be released and the braking system rendered inoperative.

The motor 144 is actuated to cause the shaft 152 to rotate in a counterclockwise direction, reference being made to FIG. 1, to release tension on the cable 154 whereby the looped end 156 may be disengaged from the anchor ring 122. The motor may then be energized to cause the shaft 152 to rotate clockwise, again as viewed in FIG. 1, causing the cable 154 to wind on the shaft 152. The clamping means 100 and 124 are now disconnected from the belt 70 in the following manner.

The wingbolts 118 are backed off to disconnect the second clamp jaw 110 from the bight portion 104 of the first clamp jaw 102. The second clamp jaw 110 is then removed from over the belt 70. The fastening means 160 is now disconnected from the plates 93, 119. The first clamping jaw 102 may now be slid transversely across the side frame members 76 below the belt 70 and removed therefrom. It will be understood, of course, that the clamping means 100 must be raised sufficiently high in order to provide clearance of its connected plate 119 over the adjacent one of the side frame members 76 as the clamping means 100 is being withdrawn.

Thereafter, the side frame members 76 are drawn upwardly and away from their associated idler rollers 64, and in being so moved, the braces 82 are removed from their respective slots 84 formed in the skid 90.

The skid 90 now being freed, may be removed from the rollers 68 by turning the same horizontally and withdrawing either the leading or trailing end portion thereof between a pair of adjacent bights 48.

The second clamping means 124 is disengaged from the belt 70 through the simple expedient of backing off the wingbolts 140 to free the first clamp jaw 126 from the second clamp jaw 134. The clamp jaw 126 is now removed from over the belt 70, and the second clamp jaw is then slid transversely across the conveyor system 12 and over one of the cables 30 until the clamp jaw 134 is free from the superimposed belt 70.

Having described and illustrated one embodiment of this invention in detail, it will be understood that the same is offered merely by way of example, and that this invention is to be limited only by the scope of the appended claims.

What is claimed is:

1. Apparatus for moving conveyor belt ends into juxtaposition for connection with one another to form an endless conveyor belt for a conveyor system having a plurality of longitudinally spaced transversely extending belt-engageable rollers, and means for supporting said rollers, said apparatus comprising:
    first clamping means releasably secured on said belt adjacent to but spaced inwardly from one end of said belt to provide a first belt portion extending beyond a side thereof;
    means for supporting said first clamping means transversely of said conveyor system;
    second clamping means releasably secured on said belt adjacent to but spaced inwardly from the other end of said belt to provide a second belt portion extending beyond a side thereof;
    means for supporting said second clamping means transversely of said conveyor system;
    said first and second belt portions extending in directions towards one another; and
    means connecting said first and second belt-clamping means and being operable to draw one of said belt-clamping means towards the other to position said extending belt portions in juxtaposition relative to one another for subsequent connection, one with the other.

2. Apparatus as defined in claim 1 wherein:
    said connecting means comprises winch means mounted on said first of said clamping means and including a shaft;
    a flexible cable having one end secured on said shaft, its other end being adapted for winding thereon; and
    means on said second clamping means for connection with said other end of said cable.

3. Apparatus as defined in claim 2 wherein:
    said support means for said second clamping means includes skid means depending therefrom for sliding engagement over said rollers as said winch means is operated.

4. Apparatus as defined in claim 3 wherein said rollers include a plurality of sets of idler rollers, each set of idler rollers including at least one normally horizontal roller and a pair of rollers converging downwardly towards, respectively, each end of said horizontal roller and wherein:
    said skid means includes a frame having a pair of side frame members slidably engageable over the upper ends of said pair of rollers; and
    means suspending said skid means from said side frame members for sliding engagement over the horizontal ones of said sets of idler rollers.

5. Apparatus as defined in claim 4 wherein:
    said skid means further includes an inverted elongated V-shaped member slidable on said horizontal rollers and having a length spanning at least an adjacent pair of said horizontal rollers.

6. Apparatus as defined in claim 5 wherein:
    said skid means further includes a plurality of braces depending downwardly from each side frame member for connection with said inverted V-shaped member.

7. Apparatus as defined in claim 6 wherein:
    said connection between said braces and said V-shaped member is releasable.

8. Apparatus as defined in claim 2 wherein:
    said first clamping means includes an inverted substantially U-shaped first clamp jaw having a bight portion, a second rectangular clamp jaw, said belt being received between said first clamp jaw and said second clamp jaw; and
    means on said first clamp jaw cooperating with means on said rectangular clamp jaw to draw said jaws relatively towards one another and to clamp said belt therebetween.

9. Apparatus as defined in claim 2 wherein said second clamping means includes a substantially U-shaped first clamp jaw having a bight portion, a second rectangular clamp jaw, said belt being received between said first and second clamp jaws; and
    means on said second clamp jaw cooperating with means on said first clamp jaw to draw said jaws relatively towards one another to clamp said belt therebetween.

10. Apparatus as defined in claim 3 wherein:
    said roller-supporting means comprises support means for said first and second clamping means.

* * * * *